United States Patent [19]

Connor

[11] Patent Number: 5,455,110
[45] Date of Patent: Oct. 3, 1995

[54] NONWOVEN LAMINATED FABRICS

[75] Inventor: Linda A. Connor, Roswell, Ga.

[73] Assignee: Kimberly-Clark Corporation, Neenah, Wis.

[21] Appl. No.: 268,048

[22] Filed: Jun. 29, 1994

[51] Int. Cl.⁶ ................................................. B32B 27/00
[52] U.S. Cl. ........................ 428/286; 428/284; 428/296; 428/297; 428/298; 428/903
[58] Field of Search ................................... 428/284, 286, 428/297, 298, 296, 903

[56] References Cited

U.S. PATENT DOCUMENTS

| | | | |
|---|---|---|---|
| Re. 31,599 | 6/1984 | Rasen et al. | 156/167 |
| 3,338,992 | 8/1967 | Kinney | 264/24 |
| 3,502,538 | 3/1970 | Petersen | 161/150 |
| 3,502,763 | 3/1970 | Hartmann | 264/210 |
| 3,542,615 | 11/1970 | Dobo et al. | 156/181 |
| 3,676,242 | 7/1972 | Prentice | 156/62.4 |
| 3,692,618 | 9/1972 | Dorschner et al. | 161/72 |
| 3,802,817 | 4/1974 | Matsuki et al. | 425/66 |
| 3,825,380 | 7/1974 | Harding et al. | 425/72 |
| 3,849,241 | 11/1974 | Butin et al. | 161/169 |
| 3,909,009 | 9/1975 | Cvetko et al. | 274/37 |
| 3,959,421 | 5/1976 | Weber et al. | 264/6 |
| 3,971,373 | 7/1976 | Brown | 128/146.2 |
| 3,981,650 | 9/1976 | Page | 425/72 S |
| 4,041,203 | 8/1977 | Brock et al. | 428/157 |
| 4,103,058 | 7/1978 | Humlicek | 428/171 |
| 4,212,692 | 7/1980 | Rasen et al. | 156/167 |
| 4,340,563 | 7/1982 | Appel et al. | 264/518 |
| 4,374,888 | 2/1983 | Bornslaeger | 428/198 |
| 4,436,780 | 3/1984 | Hotchkiss et al. | 428/198 |
| 4,443,513 | 4/1984 | Meitner et al. | 422/195 |
| 4,555,811 | 12/1985 | Shimalla | 2/51 |
| 4,618,524 | 10/1986 | Groitzsch et al. | 428/198 |
| 4,714,647 | 12/1987 | Shipp et al. | 428/296 |
| 4,741,941 | 5/1988 | Englebert et al. | 428/71 |
| 4,766,029 | 8/1988 | Brock et al. | 428/296 |
| 4,823,404 | 4/1989 | Morell et al. | 2/69 |
| 4,863,785 | 9/1989 | Berman et al. | 428/296 |
| 5,165,979 | 11/1992 | Watkins et al. | 428/113 |
| 5,188,885 | 2/1993 | Timmons et al. | 428/296 |
| 5,308,691 | 5/1994 | Lim et al. | 428/296 |

FOREIGN PATENT DOCUMENTS

| | | |
|---|---|---|
| 803714 | 1/1969 | Canada. |
| 0403535 | 7/1990 | European Pat. Off.. |

OTHER PUBLICATIONS

NRL Report 4363, "Manufacture of Superfine Organic Fibers" by V. A. Wente, E. L. Boopne and C. D. Fluharty, May 25, 1954, pp. 1–15.

NRL Report 5265, "An Improved Device For the Formation of Superfine Thermoplastic Fibers" by K. D. Lawrence, R. T. Lucas and J. A. Young, Feb. 11, 1959, pp. 1–8.

Primary Examiner—James J. Bell
Attorney, Agent, or Firm—William D. Herrick

[57] ABSTRACT

Fabrics having good bulk, barrier properties and air permeability are made by laminating a first flat spunbond web formed from thermoplastic fibers, a three-dimensional nonwoven meltblown web formed from thermoplastic fibers and a second flat spunbond web formed from thermoplastic fibers, wherein the three-dimensional nonwoven web is located between the first and second spunbond webs.

10 Claims, 2 Drawing Sheets

NONWOVEN LAMINATED FABRICS

TECHNICAL FIELD

This invention relates to nonwoven laminate fabrics including a three-dimensional nonwoven component. In one of its more specific aspects, this invention relates to nonwoven laminated fabrics having unexpectedly good characteristics with regard to the combination of bulk, barrier properties and air permeability, in which at least one web is a three-dimensional nonwoven web formed from thermoplastic fibers.

BACKGROUND OF THE INVENTION

In various industries, protective clothing is becoming of increasing importance to workers and their employers to address concerns of health, safety and cleanliness. While these concerns may change in emphasis from industry to industry, workers must be effectively protected from exposure to contaminants such as asbestos and other fibrous materials, particulate matter and liquids such as water and oil. However, while effective protection must be provided, such clothing must also provide the worker with an acceptable level of comfort (i.e., breathability). This feature is especially significant for workers who encounter extreme or varying temperatures, humidity conditions, etc.

Therefore, much effort has been directed toward the development of protective clothing which will provide workers with good levels (i.e., acceptable levels) of protection and comfort. The development of such clothing is a difficult task because protection can naturally lead to impenetrability which, in turn, tends to decrease comfort. This lack of comfort is or may be caused by the inability of the clothing to breathe.

Air permeability (i.e., porosity) is an important factor in the performance of fabrics such as those used to make protective clothing. Air permeability also provides an indication of the "breathability" of weatherproof and rainproof fabrics and of coated fabrics in general. Manufacturing processes can have an appreciable effect on porosity by causing changes in the length of air flow paths through the fabric. For example, hot calendering during the manufacturing process will flatten the fibers and reduce air permeability.

Other factors which must be addressed in the manufacture of protective clothing include bulk and barrier properties.

The prior art has attempted to address the above-described need for comfortable and protective clothing. For example, U.S. Pat. No. 4,823,404 describes a protective garment having separate top and bottom parts, in which the front of each part is made from a nonwoven fabric having a smooth calendered outer surface and an uncalendered inner surface and in which the back of each part is made from a breathable material. Additionally, U.S. Pat. No. 3,971,373 describes a porous sheet product which comprises a web of melt-blown microfibers and a three-dimensional arrangement of particles. Further, coassigned U.S. Pat. No. 5,165,979 describes a three-dimensional nonwoven web of drawn thermoplastic fibers formed from a blend of polypropylene and polybutylene and the combination of such a web with various layers in laminate form especially useful for wiper applications.

However, for various reasons, the prior art has not fully met the need for comfortable protective clothing which has both good barrier properties and good air permeability. Therefore, a need exists for such clothing.

SUMMARY OF THE INVENTION

Briefly described, the present invention provides a nonwoven laminated fabric including a three-dimensional nonwoven web and which is especially useful in the manufacture of protective clothing. In accordance with this invention, such protective clothing has unexpectedly good bulk, barrier properties and air permeability.

The nonwoven fabric of this invention comprises, in general terms, a laminate having at least three webs formed from thermoplastic fibers, at least two of which are flat nonwoven spunbond webs and at least one of which is a three-dimensional nonwoven meltblown web.

Accordingly, an object of this invention is to provide a nonwoven laminated fabric including a three-dimensional nonwoven web component.

Another object of this invention is to provide a nonwoven laminated fabric which can be effectively used in the manufacture of protective clothing.

Another object of this invention is to provide a nonwoven laminated fabric which will provide such protective clothing with good bulk (i.e., thickness) and good barrier properties against liquids such as oil and water and, therefore, provide the wearer with an acceptable level of protection.

A further object of this invention is to provide a nonwoven laminated fabric which will enable such protective clothing to have good air permeability (i.e., breathability) and, therefore, provide the wearer with an acceptable level of comfort.

A still further object of this invention is to provide a nonwoven laminated fabric which will provide the wearer of protective clothing made from such fabric with greater comfort and at least equivalent protection as protective clothing made from a nonwoven laminated fabric which does not include a three-dimensional nonwoven meltblown web.

These and other objects, features and advantages of this invention will become apparent from the following detailed description.

DETAILED DESCRIPTION OF THE INVENTION

While the present invention will be described in connection with a preferred embodiment and procedure, there is no intention to limit the invention to that embodiment or procedure. On the contrary, the intention is to cover all alternatives, modifications, and equivalents as may be included within the spirit and scope of the invention as defined by the appended claims.

In accordance with the present invention, a nonwoven laminated fabric is made by laminating (1) first and second flat nonwoven spunbond webs formed from thermoplastic fibers and (2) a three-dimensional nonwoven meltblown web formed from thermoplastic fibers, wherein the three-dimensional meltblown web is located (i.e., laminated) between the first and second spunbond webs. In a preferred embodiment of this invention, the three-dimensional meltblown web is formed from fibers which comprise a blend of polypropylene and polybutylene. In another preferred embodiment of this invention, the first and second spunbond webs are each formed from polypropylene fibers. As used herein, reference to a polymer such as "polypropylene" includes copolymers and blends with other components that can be used to produce thermoplastic fibers and filaments useful in accordance with the invention as understood by those skilled in this art.

For purposes of this invention, the term "spunbond web" refers to a web of nonwoven material formed by spunbond techniques which are conventional in this art and generally described in this application. In addition, the term "meltblown web" refers to a web of nonwoven material formed by meltblown techniques which are conventional in this art and also generally described in this application. The meltblown webs used in this invention have a three-dimensional structure, and the formation of this particular structure is described in this application.

Additionally, the term "good barrier properties" indicates that the fabric provided by this invention can be effectively used in the manufacture of protective clothing (i.e., workwear) which will provide the wearer with an acceptable and effective level of protection against liquids such as oil and water. The term "good air permeability" indicates that the fabric provided by this invention can be effectively used in the manufacture of protective clothing which is breathable and, therefore, provides the wearer with an acceptable and effective level of comfort.

Still further, the term "good bulk" indicates that the fabric provided by this invention can be effectively used in the manufacture of protective clothing which has sufficient bulk (i.e., thickness) to provide the wearer with comfortable protective clothing having an acceptable and effective level of protection against contaminants.

Figure 1:
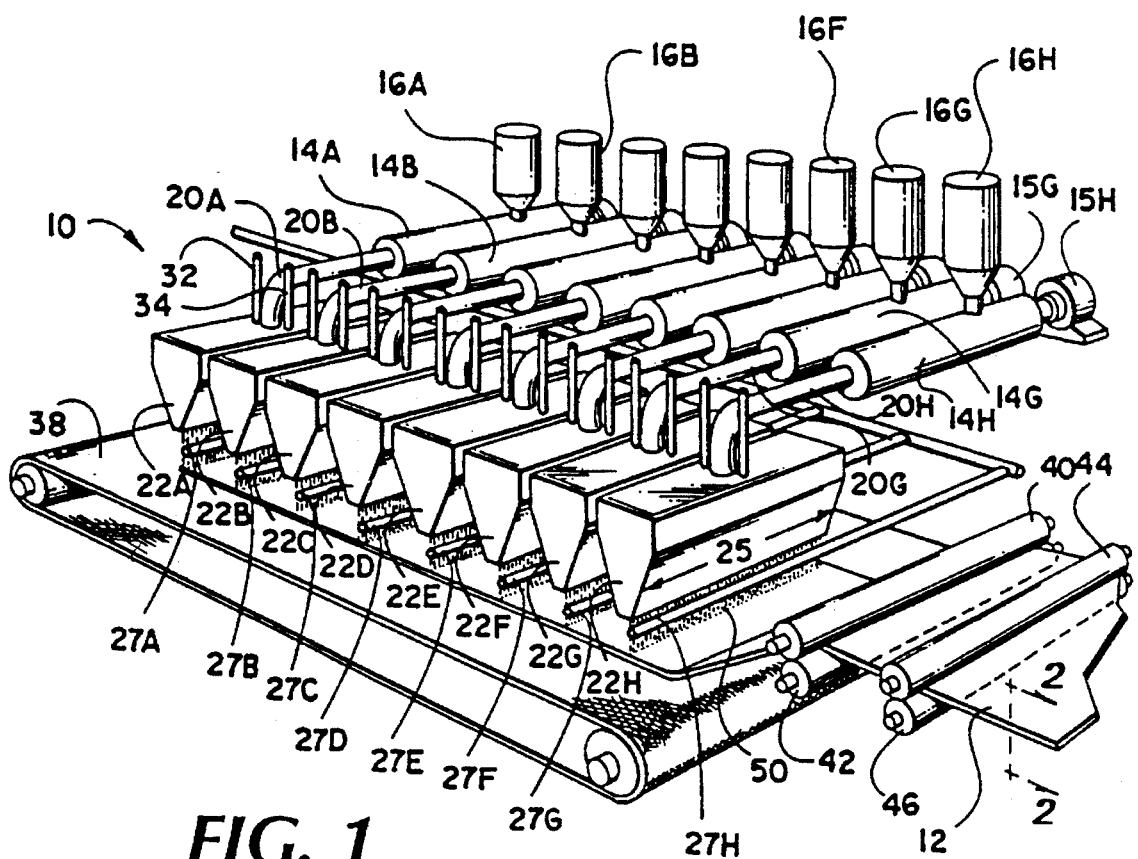
FIG. 1 is a schematic drawing showing machinery for producing a three-dimensional nonwoven meltblown web.

Turning to FIG. 1, there is shown a web forming machine 10 for forming a meltblown web 12 made up of a number of layers (102,104, 106, 108, 110, 112,114, and 116 in FIG. 2) of meltblown fibers 50. The machine 10 includes eight identical extruders 14A–H with corresponding hoppers 16A–H for receiving thermoplastic resin pellets. The extruders 14A–H include internal screw conveyors which are driven by motors 15A–H. The extruders 14A–H are heated along their lengths to the melting temperature of the thermoplastic resin pellets to form a melt. The screw conveyors driven by motors 15A–H force the thermoplastic material through the extruders into attached delivery pipes 20A–H which are connected to die heads 22A–H, each having a die width 25.

Die head 22A, for example, comprises a die tip 24 which has a die opening or orifice (not shown). The die tip may be recessed, flush or stick out. Hot fluid, usually air, is supplied to the die tip via pipes 32 and 34 (FIG. 1) which terminate in channels adjacent to the orifice of the die tip.

As the thermoplastic polymer exits the die tip for each die head, the high pressure air attenuates and breaks up the polymer stream to form fibers at each die head. In accordance with this invention, the fibers are then quenched, such as with a mist of water from spray nozzles 27A–H. The spray nozzles are located just below the orifice of the die tip and spray the fibers 50 with water at room temperature or slightly above at a flow rate of at least 0.02 liter/min/inch width of die tip. Fiber quenching is conventional as described in U.S. Pat. No. 3,959,421. Persons having skill in this art will recognize that air can also be used to quench the fibers. The basic requirement of a quenching process is to use sufficient quench to enable the meltblown fibers to be pulled into the forming surface (as described below) to form the three-dimensional layer.

Once the fibers have been quenched, they are deposited on a forming surface 38 to form the layered web. In a preferred embodiment of the present invention, the forming surface 38 is an open mesh wire surface into which the fibers are pulled to form the three-dimensional layer. However, a number of alternative types of forming surfaces 38 may be utilized to produce the desired three-dimensional layer. A variety of such forming surfaces is well known in the art and described in U.S. Pat. No. 4,741,941.

Figure 2:
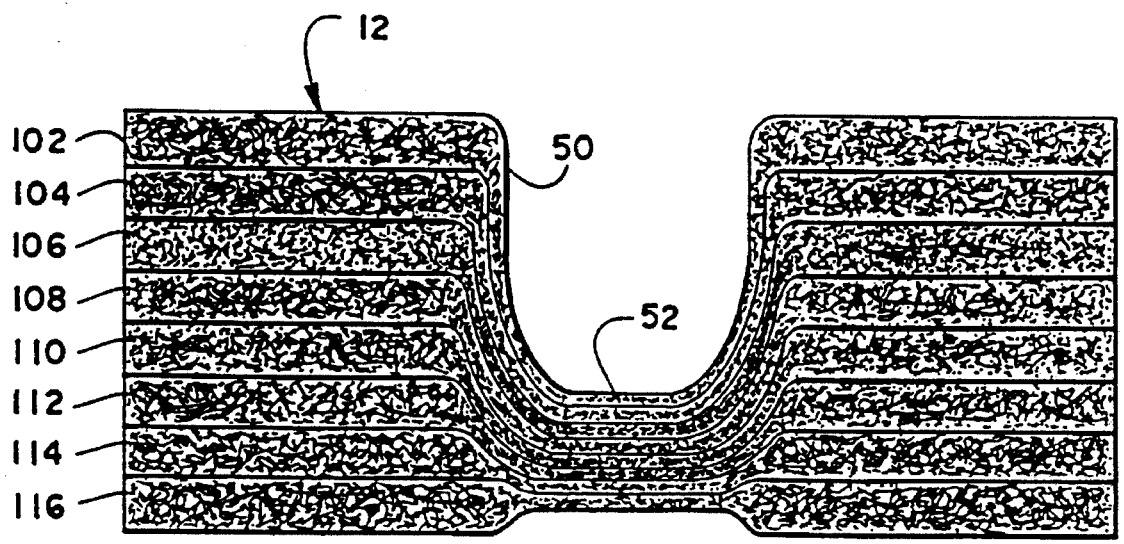
FIG. 2 is a schematic cross-sectional view of a three-dimensional nonwoven meltblown web.

A vacuum is drawn behind the forming surface 38 to draw the fibers onto the forming surface 38 during the process of melt-blowing. Separate vacuum chambers behind the forming surface 38 may be provided for each die head 22A–H. Once the fiber layers have been deposited on the forming surface 38 by the multiple die heads 22A–H, the web 12 is drawn from the forming surface 38 by withdrawal rolls 40 and 42. At this point, as shown in FIG. 1, embossing rolls 44 and 46 can be used to engage the web 12 after the withdrawal rolls to emboss the web with a pattern (as shown in FIG. 2). Further description of a desirable three-dimensional web forming process is in U.S. Pat. No. 5,165,979, which is incorporated herein in its entirety by reference.

Figure 3:
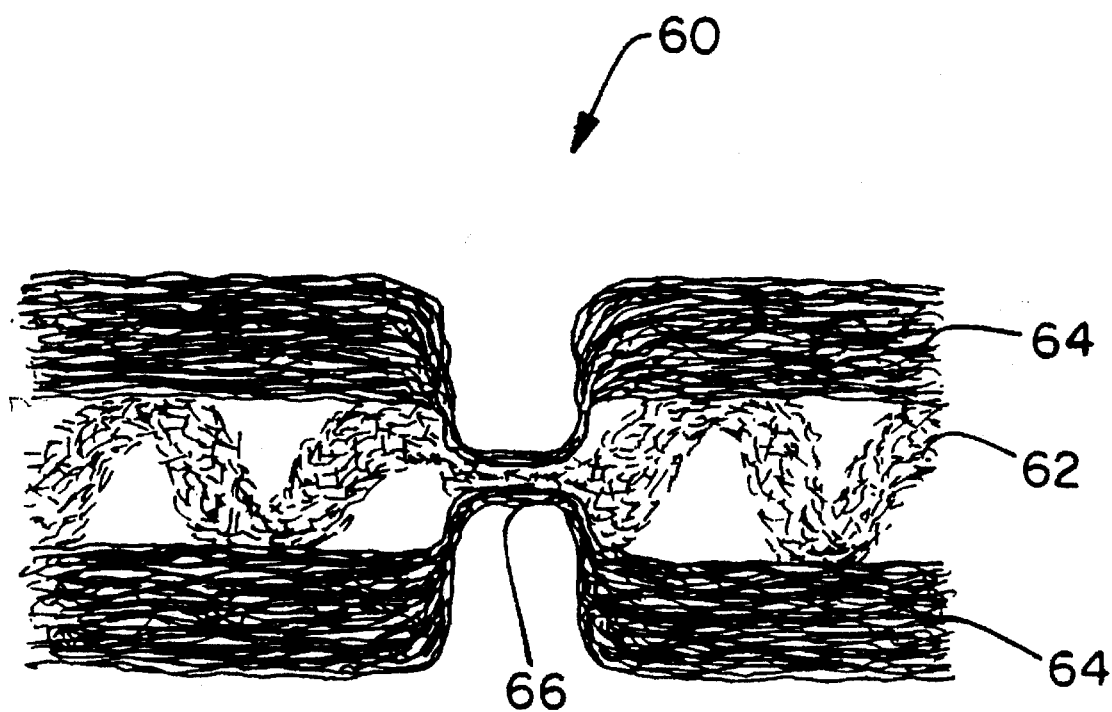
FIG. 3 is a schematic cross-sectional view of a laminate in accordance with the present invention.

Turning to FIG. 3 a laminate 60 in accordance with the present invention is shown in cross-section. Three-dimensional layer 62, shown exaggerated for clarity, is shown between flat spunbond layers 64 with the laminate spot bonded at 66. As shown, the three-dimensional nature of layer 62 adds bulk and texture to the laminate 60.

One of ordinary skill in the art will appreciate that a single head melt-blowing machine can be used instead of the multiple bank machine illustrated. In addition, the web 12 may be comprised of a single layer, multiple layers which are all identical in composition, or multiple layers some of which layers are made in accordance with the present invention and some of which layers are conventional. Moreover, one of ordinary skill in the art will appreciate that fine adjustment of the equipment and process may be required to optimize performance and efficiency. Such fine adjustment can be accomplished by one of ordinary skill without undue experimentation.

In addition, the fibers and the resulting web can be formed by other fiber forming techniques including, for example, melt-spray techniques. Melt-spraying is a process for forming fibers from a fiber forming resin using compact spray head designs usually including one to four spray heads in a cluster. The equipment includes a die housing with a hydraulic chamber and a retractable piston assembly for releasing molten resin. Upon release, the molten resin is contacted and drawn by a primary air supply which completely surrounds the molten resin and contacts it at a predetermined angle. If additional drawing and attenuation of the newly formed fibers are desired, secondary fiberization air may be used. The secondary fiberization will most typically include at least two fluid streams which each impinge upon the resin/fibers at a second angle.

In more refined embodiments, the fiberization air can also be angled to spiral around the forming fibers. Additionally, the piston within the hydraulic chamber may be cycled on and off to interrupt the flow of the fiber forming resin and thereby create discrete, pluralities of fibers.

Both melt-blowing and melt-spraying techniques can be used to produce fibers that are drawn and randomly oriented.

The nonwoven fabrics of this invention are formed using spunbond and meltblown fibers. The formation of spunbond material is conventional in the art, and the design and operation of a spunbond forming station is thought to be well within the ability of those having ordinary skill in the art. The nonwoven spunbond webs are prepared in conventional fashion such as is illustrated by the following patents: Dorschner et al. U.S. Pat. No. 3,692,618; Kinney U.S. Pat. Nos. 3,338,992 and 3,341,394; Levy U.S. Pat. No. 3,502,538; Hartmann U.S. Pat. Nos. 3,502,763 and 3,909,009; Dobo et al. U.S. Pat. No. 3,542,615; Harmon Canadian Patent No. 803,714; Matsuki et al. U.S. Pat. No. 3,802,817 and Appel et al. U.S. Pat. No. 4,340,563. Other methods for forming a nonwoven web having continuous filaments of a polymer are contemplated for use with the present invention.

Spunbond materials prepared with continuous filaments generally have at least three common features. First, the polymer is continuously extruded through a spinneret to form discrete filaments. Thereafter, the filaments are drawn either mechanically or pneumatically without breaking in order to molecularly orient the polymer filaments and achieve tenacity. Lastly, the continuous filaments are subsequently deposited in a substantially random manner onto a carrier belt and bonded to form a web.

Forming nonwoven webs of thermoplastic fibers by meltblowing is well known in the art and described in various patents and publications, including Naval Research Laboratory Report No. 4364 "Manufacture of Super-fine Organic Fibers" by V. A. Wendt, E. L. Boon, and C. D. Fluharty; Naval Research Laboratory No. 5265, "An Improved Device for the Formation of Super-fine Thermoplastic Fibers" by K. D. Lawrence, R. T. Lukas and J. A. Young; U.S. Pat. Nos. 3,849,241 to Buntin, et al.; 3,676,242 to Prentice; and 3,981,650 to Page. In general, meltblowing employs an extruder to force a hot melt of thermoplastic material through a row of fine orifices in a die tip of a die head into converging high velocity streams of heated gas, usually air, arranged on each side of the extrusion orifice. A conventional die head is disclosed in U.S. Pat. No. 3,825,380 to Harding et al. As the hot melt exits the orifices, the hot melt encounters the high velocity heated gas stream, and the stream of thermoplastic material is attenuated by the gas and broken into discrete fibers which are then deposited on a moving collector surface, such as a foraminous belt, to form a web of thermoplastic fibers. The meltblown web can then either be wound into a roll for later use, or the meltblown layer can be formed directly on spunbond web in forming a spunbond/meltblown/spunbond ("SMS") fabric laminate.

In the practice of this invention, the spunbond and meltblown webs can be processed separately and subsequently bonded to each other in an off-line procedure to form laminated fabric. These spunbond and meltblown webs can also be processed and bonded in an in-line procedure whereby the three-dimensional meltblown web is unwound between banks of unbonded spunbond webs.

In accordance with the present invention, it is advantageous to use as the three-dimensional component a three-dimensional nonwoven web of drawn and random thermoplastic fibers formed by meltblowing a blend of polypropylene and polybutylene to enhance certain properties in the meltblown web 12, as compared with 100% meltblown polypropylene. Specifically, the meltblown web 12 formed from meltblowing a blend of polypropylene and polybutylene improves the barrier properties, bulk and air permeability of the final fabric. Particularly, we have found that blends of from 90% to 50% polypropylene and from 10% to 50% polybutylene produce nonwoven meltblown webs with these desired properties.

The advantages of the present invention can be realized, for example, by blending in the meltblown layer polyethylene, polypropylene and mixtures and blends thereof; homopolymers of polypropylene and polybutylene; copolymers of polypropylene and homopolymers of polybutylene; copolymers of polypropylene and copolymers of polybutylene; polyesters, other polyolefins, polyamides and mixtures and blends thereof. The copolymers of polypropylene may have ethylene in amounts ranging up to about 6% by weight. The copolymers of polybutylene may have ethylene in amounts ranging up to about 6% by weight.

In addition, the meltblown layer may be made by using ternary blends comprising polypropylene, polybutylene, and a terpolymer composed of propylene, 1-butene and ethylene.

Meltblown webs for the fabrics of the present invention can be formed at polymer throughputs of from 1 to 15 pounds per inch of die head width per hour. Once the meltblown web has been formed, the material preferably remains unbonded until such material is bonded with the spunbond webs to form the structured fabric of this invention. For such bonding, any bond pattern with large areas between the bond points (for example, 8–20% with a large diamond pattern) can be used. However, if the bond area is too high, the interstices may be closed. The bond pattern may be a line pattern, a weave pattern or a point pattern (for example, a spiral pattern). The point pattern, with bonding occurring within certain discrete areas on the material, is preferred. The bonding may be accomplished by ultrasonic heating, by use of an adhesive or by embossing with heated rolls.

In carrying out the present invention, the thermoplastic fibers were formed by simply mixing the polymer pellets in the proper weight proportions before being added to the hoppers. The terpolymers were polymerized in the desired proportions during manufacture.

As noted above, the fabrics of this invention have good bulk (i.e., protection and comfort), good barrier properties (i.e., protection) and good air permeability (i.e., comfort). The tests used to determine barrier properties and air permeability are more fully described as follows:

A. Air Permeability

With regard to the fabrics provided by this invention, air permeability (i.e., porosity or breathability) is determined by the Frazier Porosity Test, which measures the rate of air flow through a fabric under a pressure differential between the two fabric surfaces. Since air permeability is not a linear function of pressure differential between fabric surfaces, the test is done at a prescribed differential between the two fabric surfaces of a known area of the test fabric.

In the Frazier Porosity Test, air is drawn through the test fabric (8"×8") and a calibrated orifice using a suction fan. By controlling the speed of the fan, the rate of air flow through the test fabric is adjusted to obtain a pressure differential of 0.51 in. of water between the two fabric surfaces. The amount of air flowing through the test fabric is determined from the drop in pressure across a calibrated orifice as indicated by a vertical oil manometer. This reading is converted to air flow rate using a conversion table provided by the manufacturer of the manometer. Results are expressed in cubic feet of air/square foot of test fabric/minute, or in cubic centimeter/square cm/second. The higher the number, the more air permeable (i.e., porous) the fabric.

The above procedure conforms to the specifications of Method 5450, Federal Test Methods Standard No. 191A, except that the test fabric size is 8"×8" rather than 7"×7". The larger size ensures that all sides of the test fabric extend beyond the retaining ring and facilitates clamping of the specimen securely and evenly across the orifice.

B. Barrier Properties

The barrier properties of fabrics provided by this invention are determined by a quantitative barrier test method for workwear fabrics. This method is designed to screen fabrics for the construction of protective clothing intended to be worn in low risk operations. This method will determine the performance of the barrier properties of a fabric to solvents, water and other liquids, under pressure, such as would be encountered by the wearer kneeling or leaning against a wet surface.

The barrier properties test is conducted as follows:
1. Weigh 5"×5" filter paper to 2 dp. Record this weight as A.
2. Take a 5"×5" perspex square and place a 5"×5" piece of rubber backing to the square.
3. Place a 5"×5" piece of Kimwipes® material on top of the perspex square and rubber.
4. Pipette 1.0 ml of test liquid onto the center of the Kimwipes material, making sure the liquid does not wick to the edge of the Kimwipes material.
5. Place a 6"×6" sample of the test fabric on top of the Kimwipes material containing the challenge liquid. The treated, or calendered side of test fabric should be face down on the Kimwipes material.
6. Place the weighed blotting paper on top of the test fabric.
7. Place the rubber and the second perspex square on top of the blotting paper, to form a sandwich containing the test fabric and liquid.
8. Put the sandwich on the hydraulic press and set to 0.25 tons for 1 minute.
9. Release the pressure and remove the sandwich.
10. Reweigh the blotting paper, and record this weight as B.

The results are calculated as follows:
Calculate the weight of the challenge liquid as follows:
Place a 50 ml on the balance. Tare the balance. Add 1.0 ml of the challenge liquid into the beaker. Record the weight of the liquid as C.
The % penetration is calculated as follows:

$$\frac{B-A}{C} \times 100$$

Repeat the test 5 times, calculate mean and standard deviation.
Repeat if penetration has occurred and if the blotting paper is wet.

C. Bulk

The bulk of fabrics provided by this invention is determined by a test which measures the fabric's thickness, which is defined as the distance between the upper and lower surfaces of the fabric, as measured under a specified pressure.

Thickness is one of the physical properties of textile fabrics and is a useful measure of the performance characteristics of a fabric, such as before and after abrasion or shrinkage. As thickness may vary considerably depending on the pressure applied to the fabric specimen when thickness is measured, such pressure must be carefully specified and controlled in this test procedure.

More specifically in this test procedure, the thickness or bulk of a 1"×1" circular specimen of the fabric is measured using a dial comparator equipped with a 5"×5" Lucite platen. The pressure applied by the weight of the platen, weight attachment rod and added weights is 0.1±0.01 lbs. per square inch (182±5 grams). The thickness of the specimens is measured to the nearest thousandth of an inch. Five specimens are tested from each fabric sample, and the average is calculated.

In this test procedure, the testing equipment should be located in, and fabric samples conditioned to, the testing atmosphere. The standard atmosphere for testing is air maintained at a relative humidity of 50±2% and a temperature of 73°±2° F. Conditioning time is 2 hours; however, this time can be shortened if equilibrium is reached. Equilibrium is considered to have been reached when the increase in weight of the fabric sample, in successive weighings taken at least 30 minutes apart, is less than 0.1% of the weight of the sample.

For purposes of this invention, there are no established minimum or maximum specifications for barrier properties, bulk and air permeability. These characteristics must be considered in combination to provide the desired nonwoven laminated fabrics of this invention. Depending on the conditions in which protective clothing made from such fabrics will be used, one of these characteristics may be more significant than the other.

The present invention is further illustrated by the following examples which are illustrative of certain embodiments designed to teach those of ordinary skill in this art how to practice this invention and to represent the best mode contemplated for carrying out this invention.

In these examples, the following abbreviations have the indicated definitions:
osy=ounce per square yard
SB=spunbond
MB=meltblown
PP=polypropylene
PB=polybutylene
3D=three-dimensional
SD=standard deviation
SMS=spunbond/meltblown/spunbond In preparing the samples, the polymer compositions are first prepared by conventional methods, using the components shown in the examples. Next, nonwoven fabric samples are formed by methods well known in the art.

Examples

Laminated fabrics having an SMS web structure are made using the polymer compositions as shown in Table 1.

The three-dimensional meltblown webs are made using a melt-blowing machine similar to that shown in FIG. 1. The spunbond webs and the flat meltblown webs are made by conventional techniques and with machines well-known in the industry.

In Examples 1–6, the webs are thermally bonded (i.e., laminated) using a top pattern roll maintained at 320° F., a bottom pattern roll maintained at 315° F., bond roll pressure of 250–350 pounds per square inch, and a line speed of 184–384 feet per minute. The bond pattern is a spiral pattern with an 8% bond area. The 3D meltblown web is processed on a 12×12 mesh forming wire.

The forming wire for the 3D meltblown web determines the level of three-dimensionality of this web. In addition to the 12×12 forming wire, wire from an 8×8 to a 16×16 mesh size can be used to make this web.

In Example 7, the webs are thermally bonded off-line using a top pattern roll maintained at 254° F., a bottom anvil roll maintained at 242° F., bond roll pressure of 20 pounds per square inch, and a line speed of 28 feet per minute. The bond pattern is a large diamond pattern with an 8% bond area and about 28 bonds per square inch.

These sample fabrics are then tested for oil and water barrier properties, bulk and air permeability (i.e., porosity) in accordance with the tests described earlier in this application.

The test results indicate that there is good bulk for protection and comfort and equal liquid penetration with the flat and 3D meltblown webs, but the air permeability is much higher with the 3D meltblown web. The higher air permeability indicates higher breathability and, therefore, greater comfort, but with equal barrier protection to the SMS structures with a flat meltblown web.

TABLE 1

| Example | Fabric wt. (osy) | MB wt. (osy) | MB Structure | MB Composition | |
|---|---|---|---|---|---|
| 1 | 2.4 | 1.2 | Flat | 100% | *Polypropylene |
| 2 | 2.4 | 1.2 | Flat | 80/20 | *Polypropylene/ Polybutylene** |
| 3 | 2.4 | 1.2 | 3D | 80/20 | *Polypropylene/ Polybutylene** |
| 4 | 1.8 | 0.6 | Flat | 100% | *Polypropylene |
| 5 | 1.8 | 0.6 | Flat | 80/20 | *Polypropylene/ Polybutylene** |
| 6 | 1.8 | 0.6 | 3D | 80/20 | *Polypropylene/ Polybutylene** |
| 7 | 2.8 | 1.2 | 3D | 75/25 | *Polypropylene/ Polybutylene** |
| 8 | 1.8 | 0.6 | Flat | 100% | *Polypropylene |

*PF015 designation, believed equivalent to Valtec HH442H from Himont
**Duraflex DP8910 from Shell The fabrics of Examples 1–6 were bonded in-line, while the fabric of Example 7 was bonded off-line with a prebonded spunbond web. Additionally, the meltblown webs of Examples 1–6 were made off-line and then unwound between two banks of unbonded spunbond webs. The fabric of Example 8 was untreated and was bonded in-line with a spunbond web. The fabric of Example 8 has a HP bond pattern and represents a normal SMS fabric which is commonly used for protective clothing.

TABLE 2

| | Liquid Penetration % | | | | |
|---|---|---|---|---|---|
| | Water | | Oil | | Air Permeability |
| Example | Ave. | SD | Ave. | SD | cm3/cm2/sec |
| 1 | 3.0 | 4.2 | 18.4 | 1.6 | 10.1 |
| 2 | 6.8 | 6.6 | 21.4 | 3.1 | 8.7 |
| 3 | 4.2 | 5.8 | 17.9 | 1.3 | 29.5 |
| 4 | 0 | 0 | 18.4 | 3.3 | 18.8 |
| 5 | 3.8 | 5.2 | 23.2 | 3.9 | 15.8 |
| 6 | 4.8 | 1.3 | 22.1 | 2.2 | 54.4 |
| 7 | 8.0 | 5.1 | 17.0 | 4.7 | 19.0 |
| 8 | 12.3 | — | 20.9 | — | — |

TABLE 3

| | Bulk (inches) | |
|---|---|---|
| Example | Ave. | SD |
| 1 | .029 | .002 |
| 2 | .027 | .002 |
| 3 | .046 | .004 |
| 4 | .023 | .001 |
| 5 | .029 | .001 |
| 6 | .036 | .001 |
| 7 | — | — |
| 8 | — | — |

The fabric of Example 8 was not tested for air permeability, and the fabrics of Examples 7 and 8 were not tested for bulk.

With regard to the nonwoven laminate fabrics of this invention, other materials can be added as desired to achieve various effects examples of such other materials include dyes and pigments. If used, these materials are used in the amounts conventional in the industry.

This invention has been described in detail with particular reference to certain embodiments, but variations and modifications can be made without departing from the spirit and scope of the invention as defined in the following claims.

What is claimed is:

1. A nonwoven fabric laminate having good barrier properties, bulk and air permeability, wherein the laminated fabric comprises:

A. a first flat nonwoven spunbond web formed from thermoplastic fibers;

B. a three-dimensional nonwoven meltblown web formed from thermoplastic fibers; and C. a second flat nonwoven spunbond web formed from thermoplastic fibers;

wherein the three-dimensional meltblown web is located between and bonded to the first and second spunbond webs.

2. A nonwoven fabric laminate as defined by claim 1 wherein the first spunbond web is formed from polypropylene fibers.

3. A nonwoven fabric laminate as defined by claim 1 wherein the three-dimensional meltblown web is formed from fibers which comprise a blend of polypropylene and polybutylene.

4. A nonwoven fabric laminate as defined by claim 3 wherein the blend is comprised of from 50% to 90% polypropylene and from 10% to 50% polybutylene.

5. A nonwoven fabric laminate as defined by claim 3 wherein the three-dimensional meltblown web is formed from fibers which comprise a blend of (a) polypropylene, (b) polybutylene and (c) polyethylene or a blend of polyethylene and polypropylene.

6. A nonwoven fabric laminate as defined by claim 3 wherein the three-dimensional meltblown web is formed from fibers which comprise a blend of polypropylene, polybutylene and a terpolymer which comprises a blend of propylene, 1-butene and ethylene.

7. A nonwoven fabric laminate as defined by claim 1 wherein the second spunbond web is formed from polypropylene fibers.

8. A protective garment comprising the nonwoven fabric of claim 1.

9. A protective garment comprising the nonwoven fabric laminate of claim 3.

10. A protective garment comprising the nonwoven fabric laminate of claim 7.

* * * * *